United States Patent [19]
Nakajima et al.

[11] Patent Number: 5,600,948
[45] Date of Patent: Feb. 11, 1997

[54] ENGINE AIR-FUEL RATIO CONTROLLER

[75] Inventors: Yuki Nakajima, Yokosuka; Kenichi Sato, Yokohama, both of Japan

[73] Assignee: Nissan Motor Co., Ltd., Yokohama, Japan

[21] Appl. No.: 277,028

[22] Filed: Jul. 19, 1994

[30] Foreign Application Priority Data

Jul. 29, 1993 [JP] Japan .................................. 5-188187

[51] Int. Cl.$^6$ ................................................. F01N 3/28
[52] U.S. Cl. ............................ 60/276; 60/277; 60/285
[58] Field of Search ........................... 60/274, 276, 277, 60/285

[56] References Cited

U.S. PATENT DOCUMENTS

| | | | |
|---|---|---|---|
| 4,656,829 | 4/1987 | Creps | 60/277 |
| 5,158,063 | 10/1992 | Hosoda | 60/277 |
| 5,291,673 | 3/1994 | Hamburg | 60/276 |
| 5,303,168 | 4/1994 | Cullen | 123/425 |

FOREIGN PATENT DOCUMENTS 60-90949  5/1985  Japan .

*Primary Examiner*—Douglas Hart
*Attorney, Agent, or Firm*—Foley & Lardner

[57] ABSTRACT

A control constant in air-fuel ratio feedback control is determined based on steady state engine running conditions. The difference between the exhaust gas temperature when the engine is In the steady state and the real exhaust gas temperature is found, and the control constant is corrected to rich or lean based on this difference. Preferably, the control constant is corrected to rich when the real exhaust gas temperature is lower than the steady state exhaust gas temperature by more than a fixed value. For example during acceleration or Immediately after start-up, even If the engine speed and load are the same as in the steady state, the exhaust gas temperature is lower than the exhaust gas temperature in the steady state. On the other hand, the air-fuel ratio at which the exhaust conversion efficiency of the catalytic converter is optimized varies with the exhaust gas temperature. However, the aforesaid correction procedure adjusts the air-fuel ratio according to the real exhaust gas temperature, hence the exhaust gas conversion efficiency of the converter is always at its optimum level.

11 Claims, 21 Drawing Sheets

ENGINE AIR-FUEL RATIO CONTROLLER

FIELD OF THE INVENTION

This invention relates to air-fuel ratio control for optimizing the exhaust conversion efficiency of a three-way catalytic converter installed in the exhaust passage of an engine, and more specifically to air-fuel ratio control based on the catalyst temperature.

BACKGROUND OF THE INVENTION

In order that the three-way catalytic converter installed In the exhaust passage of an engine can efficiently reduce NOx and oxidize HC, CO, It is necessary to control a air-fuel ratio very precisely. Conventionally, the real air-fuel ratio is detected by means of an oxygen sensor from the oxygen concentration In the exhaust, and the air-fuel ratio is feedback controlled to a target value by increasing or decreasing a fuel injection amount based on the real air-fuel ratio.

The target value is close to the theoretical (stolchlometrlc) air-fuel ratio, but the air-fuel ratio at which the catalyst In the converter operates most efficiently varies slightly with the temperature of the catalyst. For example, the required air-fuel ratio when the catalyst temperature is low, is slightly richer than the air-fuel ratio under normal running conditions when the catalyst is fully active. In such a condition, therefore, it is desirable from the viewpoint of increasing the conversion efficiency of the catalyst to slightly shift the air-fuel ratio to rich.

If the engine running conditions are steady, i.e. under normal running conditions, the catalyst temperature is effectively determined by the engine speed and load. Therefore, if a feedback control constant is determined for each control cycle according to the engine speed and load, a satisfactory exhaust cleaning efficiency (catalyst conversion efficiency) can be maintained.

However, under transient engine running conditions such as acceleration and deceleration, the catalyst temperature is not necessarily the same as in the steady state even for the same engine speed and load. For example, the catalyst temperature during acceleration does not immediately follow the change of running conditions, and the catalyst temperature is somewhat lower than in the steady state for the same speed and load. The air-fuel ratio based on steady state data will therefore be different from the air-fuel ratio actually required by the catalyst temperature.

Further, as engine speed and load do not precisely correspond with the catalyst temperature until catalyst warm-up is complete, the air-fuel ratio required by the catalyst temperature cannot be obtained by performing air-fuel ratio control based on a control constant found from the engine speed and load. The catalyst temperature before warm-up is complete is considerably lower than the catalyst temperature under steady state running conditions for the same engine speed and load. For this reason also, the air-fuel ratio based on data obtained under steady state conditions will be different from the air-fuel ratio required by the catalyst temperature.

An air-fuel ratio controller which modifies the air-fuel ratio based on engine speed and catalyst temperature is disclosed for example in Japanese Tokkai Sho 60-90949 published by the Japanese Patent Office. This controller varies the target air-fuel ratio according to the difference between a target catalyst temperature determined by the engine speed and a real catalyst temperature which is actually detected.

However, the essential feature of this controller was to prevent deterioration and damage of exhaust system components due to excessive rise of catalyst temperature, for example under lean running conditions, by shifting the air-fuel ratio to rich which had the effect of decreasing the catalyst temperature.

In other words, although the air-fuel ratio was controlled according to the catalyst temperature, the purpose of control was not to Improve catalyst conversion efficiency, hence this device did not offer any improvement of exhaust cleaning performance.

SUMMARY OF THE INVENTION

It is therefore an object of this invention to optimize the conversion efficiency of a three-way catalytic converter by controlling the air-fuel ratio based on engine speed, engine load and catalyst temperature.

It is a further object of this invention to improve the conversion efficiency of the three-way catalytic converter under transient running conditions or during warm-up.

It is yet a further object of this invention to compensate the response delay of the catalyst in the converter with respect to changes of engine speed and load under transient running conditions.

It is yet a further object of this invention to perform high precision air-fuel ratio control reflecting the degree of warm-up of the catalyst.

It is yet a further object of this invention to perform air-fuel ratio control based on engine speed, engine load and temperature of the catalyst using a small number of sensors.

It is yet a further object of this invention to enhance stability of air-fuel ratio control based on engine speed, engine load and temperature of the catalyst.

It is yet a further object of this Invention to enhance the response of air-fuel ratio control based on engine speed, engine load and temperature of the catalyst.

In order to achieve the above objects, this invention provides an air-fuel ratio controller for use with an engine which has a cylinder for burning a fuel mixed with air, an intake passage for providing the air to the cylinder, a throttle for regulating an amount of the air, an exhaust passage for expelling exhaust gas from the cylinder, and a catalytic converter having an inlet and an outlet connected to the exhaust passage in order to clean the exhaust gas.

This controller comprises a sensor for detecting an oxygen concentration in the exhaust gas, a mechanism for feedback controlling an air-fuel ratio in the cylinder by means of a predetermined control constant according to the oxygen concentration such that the ratio is close to a theoretical air-fuel ratio, a mechanism for detecting an engine speed, a mechanism for detecting an engine load, a mechanism for setting the control constant based on the speed and load, a mechanism for estimating an exhaust gas temperature based on the speed and load, a mechanism for detecting a real exhaust gas temperature, and a mechanism for correcting the control constant such that the air-fuel ratio tends to rich when the real exhaust gas temperature is less than the estimated exhaust gas temperature.

The correcting mechanism preferably comprises a mechanism for calculating a difference between the real exhaust gas temperature and the estimated exhaust gas temperature, and a mechanism for computing a correction amount of the control constant based on the difference.

The computing mechanism preferably comprises a mechanism for computing the correction amount based on the difference and the real exhaust gas temperature.

It is also preferable that the estimating mechanism comprises a sensor for detecting the inlet temperature and a mechanism for estimating the outlet temperature based on the inlet temperature, the real exhaust gas temperature detecting mechanism comprises a sensor for detecting the outlet temperature, and the computing mechanism computes the correction amount based on the difference between the estimated outlet temperature and the detected outlet temperature.

Alternatively, the estimating mechanism comprises a mechanism for estimating a temperature of the inlet, and the real exhaust gas temperature detecting mechanism comprises a sensor for detecting the inlet temperature.

Alternatively, the estimating mechanism comprises a mechanism for estimating a temperature of the outlet, and the real exhaust gas temperature detecting a mechanism comprises a sensor for detecting the outlet temperature.

Alternatively, the real exhaust gas temperature detecting mechanism comprises a mechanism for computing an exhaust gas flowrate In the exhaust passage based on the speed and load, and a mechanism for estimating the inlet temperature based on the computed exhaust gas temperature and the exhaust gas flowrate.

It is also preferably that the controller further comprise a mechanism for computing a variation rate of the real exhaust gas temperature, and a mechanism for prohibiting correction of the control constant by the correcting a mechanism when the variation rate is less than a predetermined value.

The details as well as other features and advantages of this invention are set forth in the remainder of the specification and are shown in the accompanying drawings.

DESCRIPTION OF THE PREFERRED EMBODIMENTS

Figure 1:
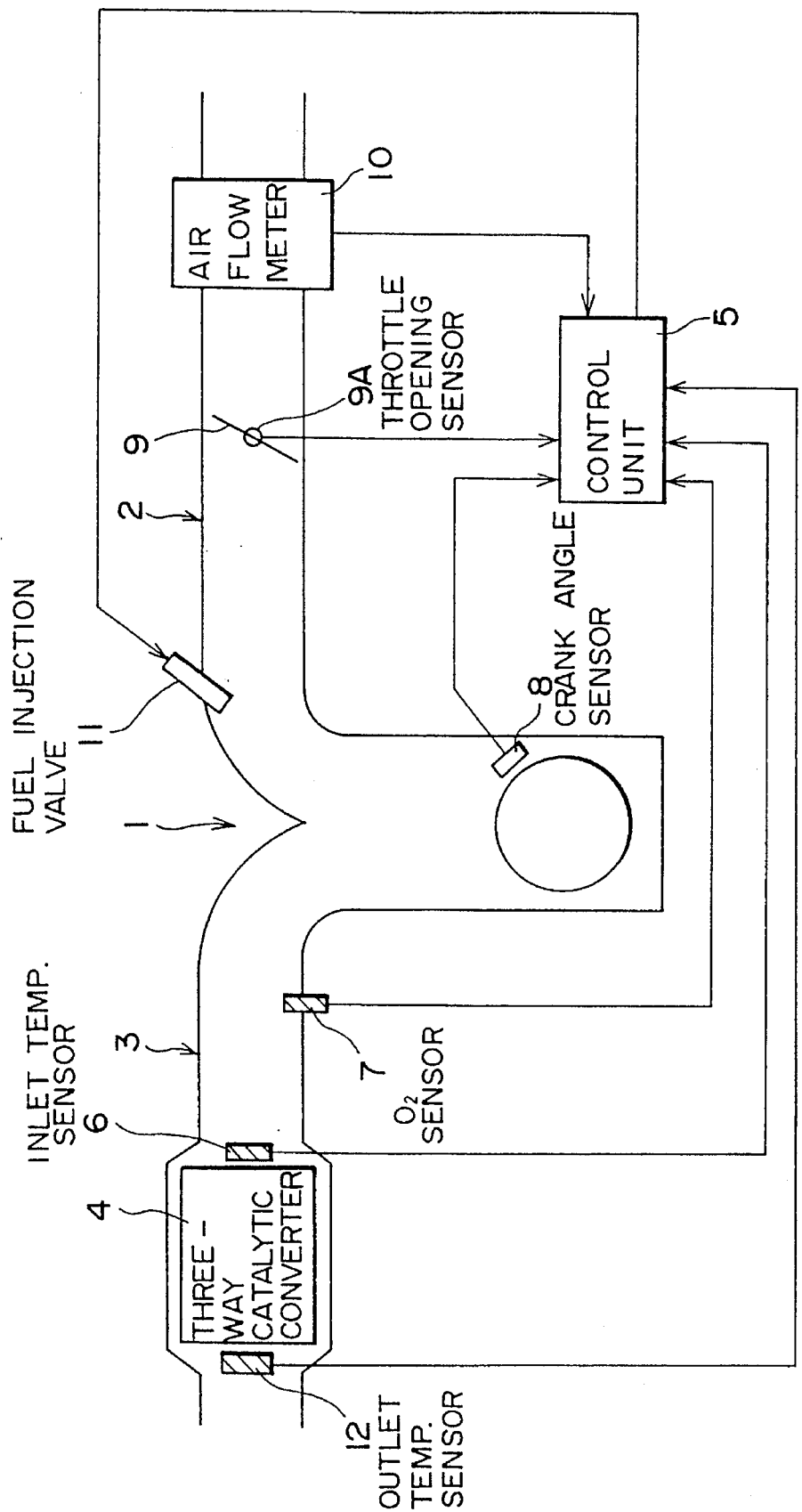
FIG. 1 is a schematic diagram of an air-fuel ratio controller according to a first embodiment of tills invention.

Referring to FIG. 1 of the drawings, an intake passage 2 and exhaust passage 3 are connected to a pre-mixing reciprocating engine 1, and a three-way catalytic converter 4 that reduces NOx and oxidizes HC, CO in the exhaust gas is installed in the exhaust passage 3. A throttle 9 for controlling an intake air amount in response to a depression of an accelerator pedal, not shown, and a fuel injection valve 11 for injecting fuel Into the air, are installed in the intake passage 2. The fuel amount injected by the fuel injection valve 11 is controlled by a control unit 5.

Signals from an air flow meter 10 for measuring intake air amount, crank angle sensor 8 for detecting engine speed, oxygen sensor 7 for measuring oxygen concentration in the exhaust gas, inlet temperature sensor 6 for detecting the inlet temperature of the three-way catalytic converter 4, outlet temperature sensor 12 for detecting the outlet temperature, throttle opening sensor 9A for detecting the degree of opening of the throttle 9 and an idle switch, not shown, for detecting when the throttle 9 is fully closed, are respectively input to the control unit 5.

Based on these signals, the control unit 5 feedback controls the proportion of injected fuel and intake air, i.e. it feedback controls, the fuel injection amount so that the air-fuel ratio is basically the theoretical air-fuel ratio.

The fuel Injection amount is expressed as a fuel injection pulse width. This fuel injection pulse is synchronized with the engine speed. A basic pulse width Tp which occupies the majority of the fuel injection pulse width is given by the following equation:

$$Tp=K*Q/Ne$$

where, K is a constant,
Ne is an engine speed, and
Q is an intake air amount.

In the subsequent control process, Tp is also used as a signal which expresses the engine load. The basic pulse width Tp is corrected based on the oxygen concentration in the exhaust gas detected by the oxygen sensor 7, and is feedback controlled so that the air excess rate $\lambda=1$ (corresponding to the theoretical air-fuel ratio). The output of the oxygen sensor 7 varies according to the oxygen concentration in the exhaust gas, and the output is inverted when the air-fuel ratio changes from rich to lean or vice versa with respect to the theoretical air-fuel ratio.

Figure 3:
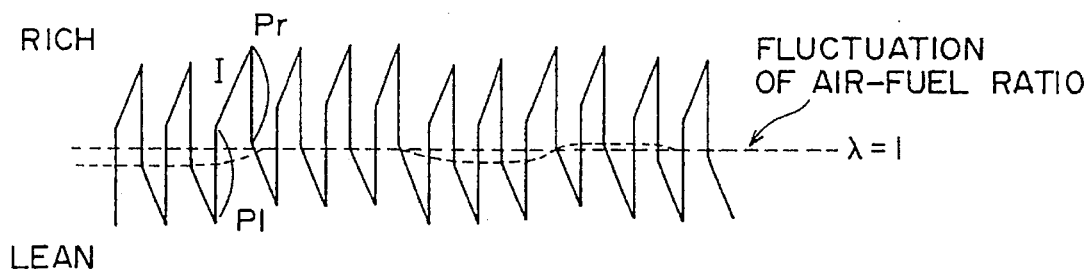
FIG. 3 is a waveform diagram showing a variation of air-fuel ratio due to PI control.

Based on these signals, the control unit 5 increases the fuel amount when the air-fuel ratio is lean, and decreases the fuel amount when the air-fuel ratio is rich so as to perform proportional and integral control as shown in FIG. 3.

A proportional amount P and integral amount I are used as control constants for this purpose. The proportional amount P is further divided into a control increment Pl which shifts the air-fuel ratio from lean to rich, and a control increment Pr which shifts the air-fuel ratio from rich to lean. When Pl is increased, the overshoot towards rich increases, and the average air-fuel ratio shifts to rich. Conversely, when Pr is increased, the average air-fuel ratio shifts to lean.

Figures 2A, 2B:
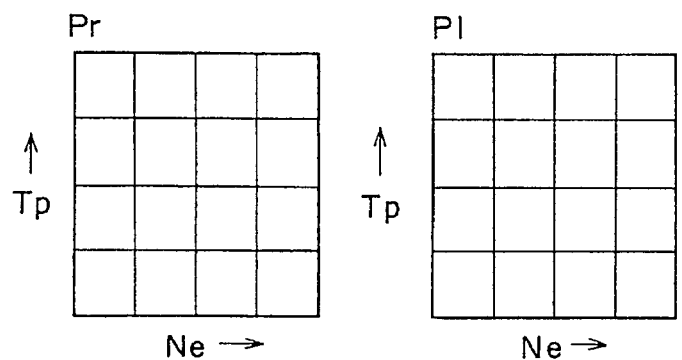
FIG. 2A and 2B are diagrams respectively showing the form of maps of control constants Pr, Pl which are stored in the air-fuel ratio controller.

A map of values of Pl and Pr based on the engine speed Ne and load Tp as shown in FIG. 2A and 2B is respectively stored in the control unit 5.

The control unit 5 looks up these maps for each rotation of the engine 1 from the detected value of Ne and calculated value of Tp.

After applying a predetermined correction, the calculated control constants Pl, Pr are applied to the aforesaid feedback control. Specific figures are not entered on the maps of FIG. 2A and 2B, but suitable values are set which optimize the cleaning efficiency of the three-way catalytic converter 4 according to the engine speed Ne and load Tp when the engine is running under steady state (normal) conditions.

Figure 4:
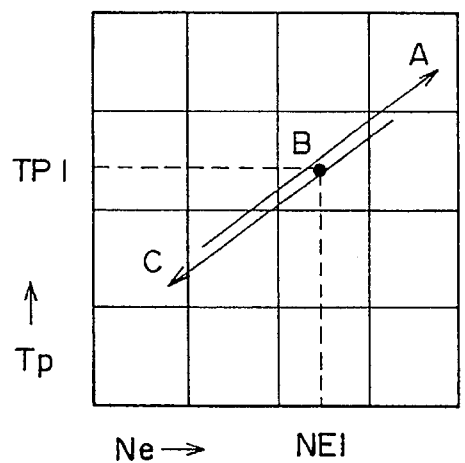
FIG. 4 is a diagram showing a variation of engine running conditions.

However, as shown in FIG. 4, even at a given engine speed Ne1 and load Tp1, three cases may be distinguished, i.e., when the engine is passing this point during acceleration (Case A), when the engine speed and load are steady at this point as under normal running conditions (Case B), and when the engine is passing this point during deceleration (Case C). Hence, although the engine speed and load are the same, the temperature of the three-way catalytic converter 4 will be different, and the point at which the catalyst is most efficient will be slightly different according to its temperature.

Figure 5:
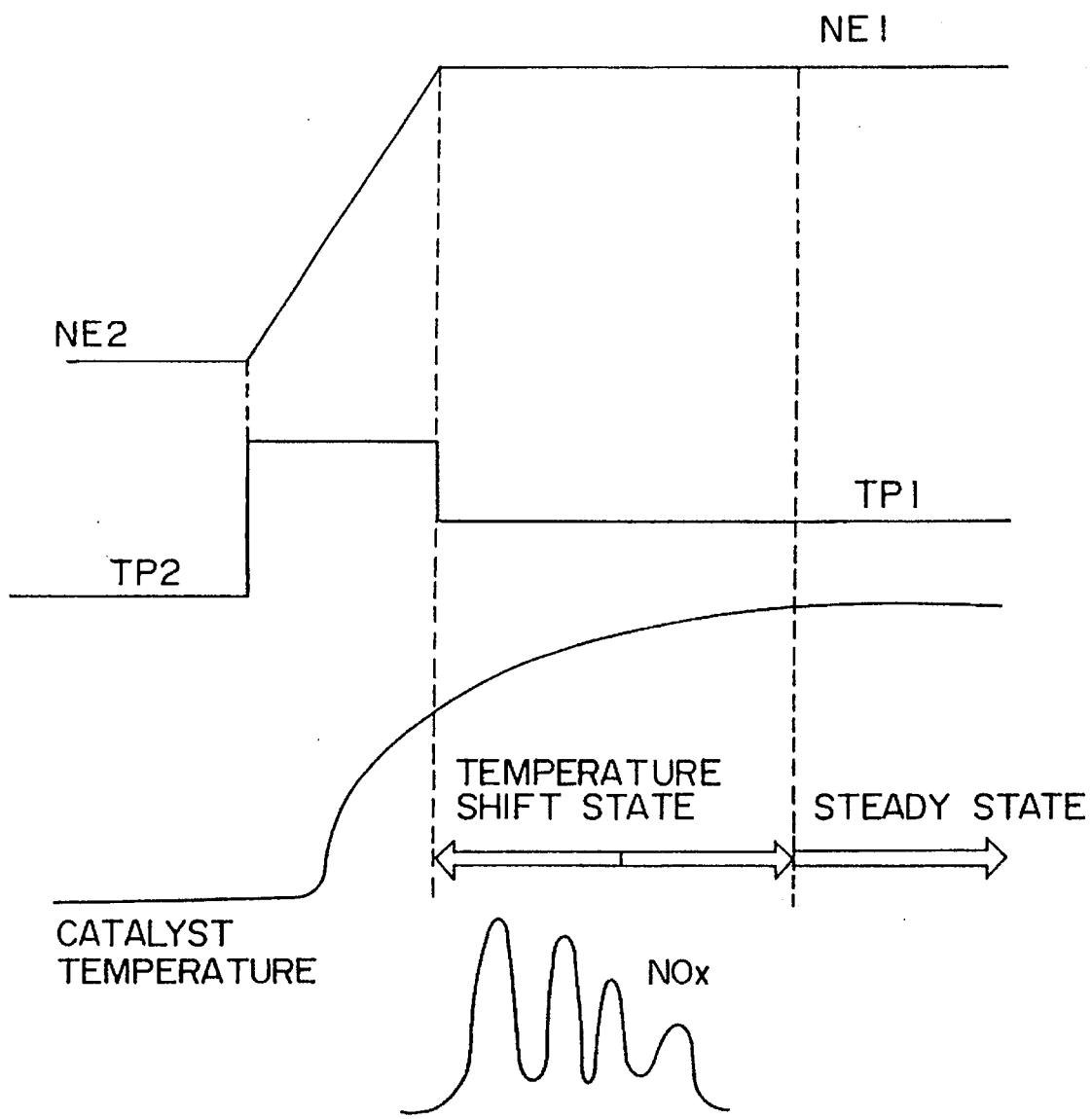
FIG. 5 is a diagram showing a relation between the variation of engine running conditions and variation of catalyst temperature.

For example, consider the case when there is a change from an engine speed Ne2 and load Tp2 to an engine speed Ne1 and load Tp1 as shown In FIG. 5. In this case, the catalyst temperature varies with a time lag with respect to the running state of the engine 1 during the period from steady state before acceleration to steady state after acceleration. This state will hereinafter be referred to as a temperature shift state.

Therefore, Pl and Pr determined based on Ne and Tp during acceleration do not give a control suited to the catalyst temperature. Further, although the running state of the engine 1 may have reached an engine speed of Ne1 and load Tp1 as a result of acceleration, Pl and Pr based on this speed and load cannot glove the optimum control constants for a certain time period and the amount of NOx In the exhaust gas therefore increases.

Figure 6:
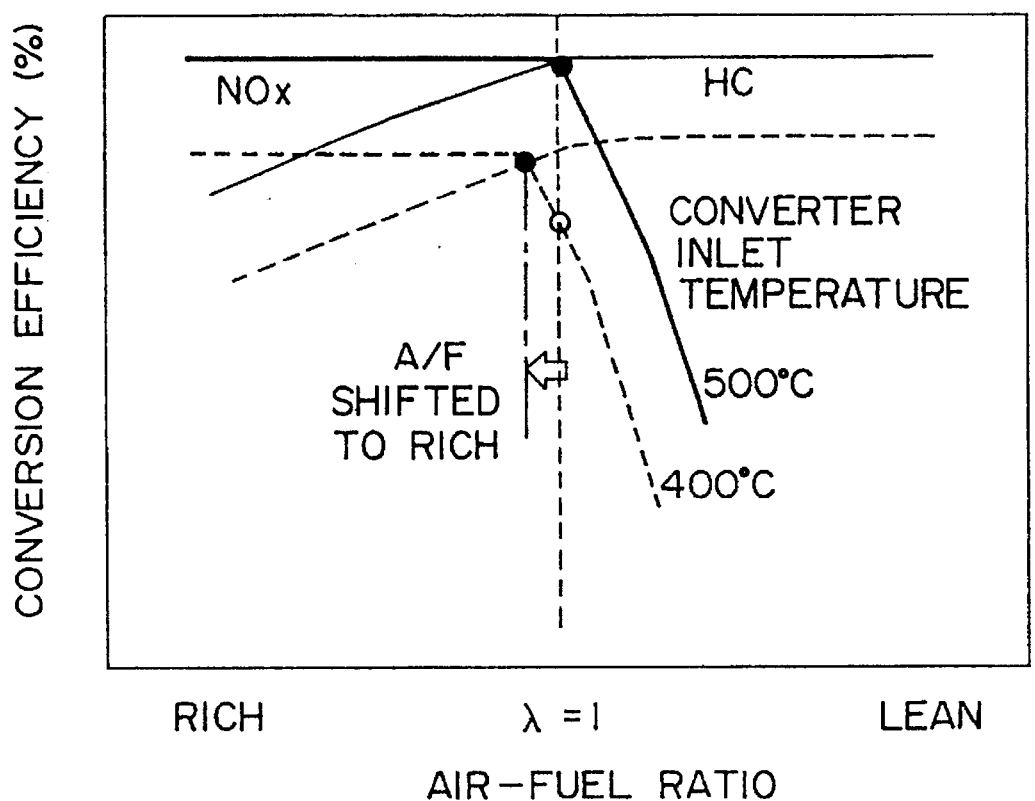
FIG. 6 is a graph showing a relation between catalyst temperature and catalyst conversion efficiency.

FIG. 6 shows the catalyst conversion efficiency when the converter inlet temperature (exhaust gas temperature) is 500° C. and 400° C. At 400° C., the conversion efficiency is lower than at 500° C., and the point at which maximum conversion efficiency of both NOx and HC are obtained is slightly shifted to rich with respect to the theoretical air-fuel ratio. At the same time, during acceleration, the catalyst temperature is lower than during steady state running conditions for the same engine speed and load. As a result, If an air-fuel ratio feedback control constant is determined solely on the basis of speed Ne and load Tp during acceleration, the air-fuel ratio is corrected to lean although the catalyst still requires it to be rich, and more NOx is emitted.

In general, when the engine is in a transient running state, the catalyst temperature varies with a certain time lag with respect to change of engine running state. Moreover, this time lag itself fluctuates depending on the nature of the transient conditions such as rapid acceleration or slow acceleration.

According to this invention, a target steady state converter inlet temperature which is preset according to each set of running conditions is computed, the difference between this temperature and an exhaust gas temperature detected by the inlet temperature sensor 6 installed in the converter inlet is found, and the aforesaid control constant is corrected according to the difference.

Figure 7:
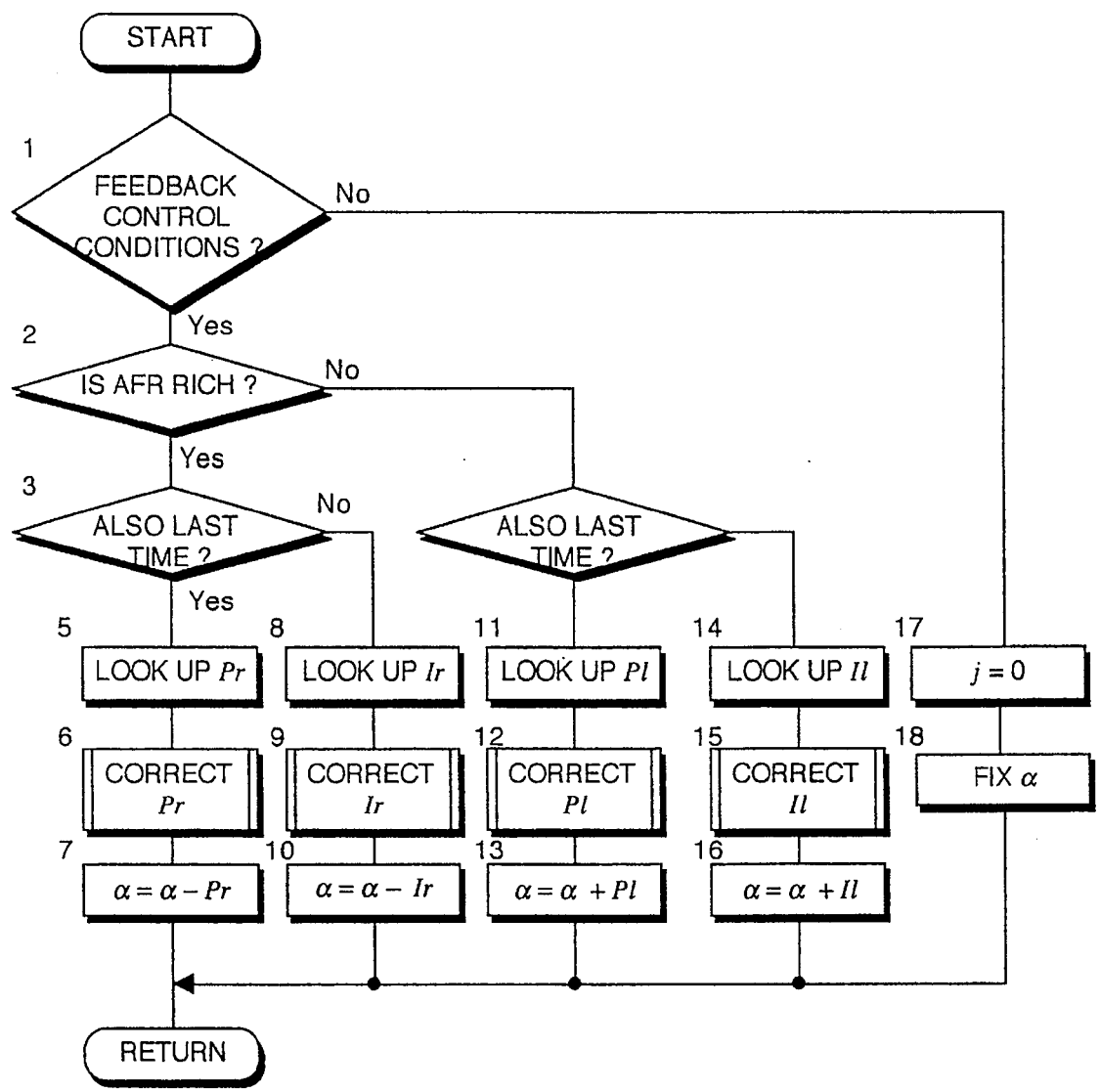
FIG. 7 is a flowchart showing a main control process performed by the air-fuel ratio controller according to the first embodiment of this invention.
Figure 8:
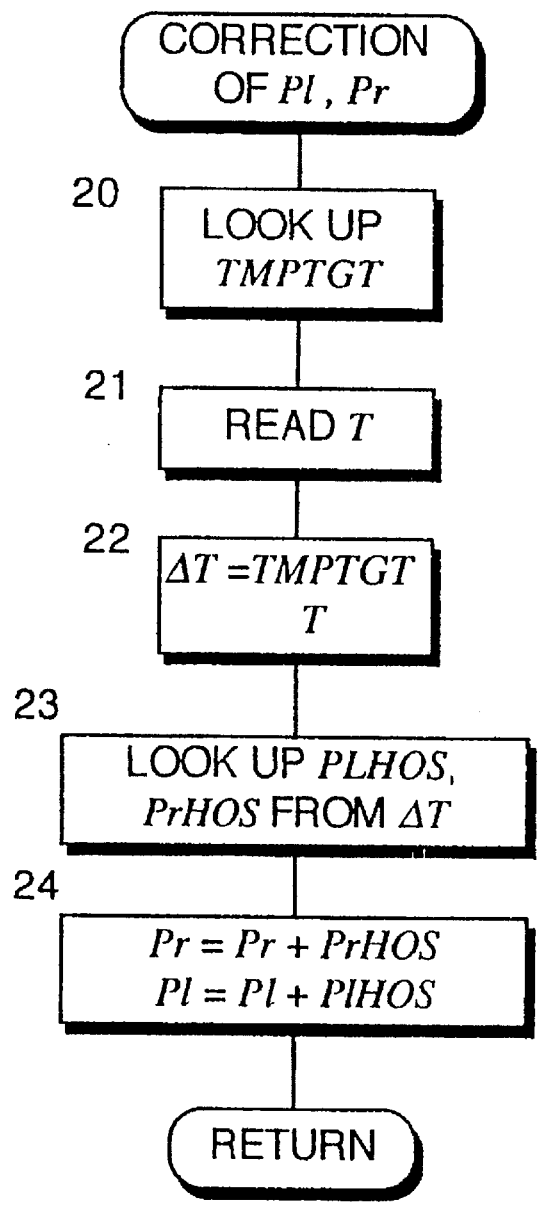
FIG. 8 is a flowchart showing the correction of control constants performed by the air-fuel ratio controller according to the first embodiment of this invention.

FIGS. 7 and 8 are flowcharts for the purpose of describing the control process executed by the control unit 5. The basic air-fuel ratio feedback control will now be described with reference to FIG. 7.

First, it is determined whether or not air-fuel ratio feedback (F/B) control is being performed based on the output of the oxygen sensor 7 in the current running state of the engine 1 (step 1). If feedback control is not being performed, an air-fuel ratio correction coefficient a is stored in a fixed value (steps 17, 18). As a result, the air-fuel ratio is also maintained as a fixed value.

If feedback control is being performed, it is determined whether the air-fuel ratio is rich from the detected oxygen concentration (step 2). If it is not rich, i.e. if it is lean, the result of this determination on the immediately preceding occasion is examined (step 4). If it was lean on the immediately preceding occasion, the proportional amount Pl of the control constant is looked up from a map shown in FIG. 2B so as to control the air-fuel ratio to rich (step 11).

Pl selected in this manner is then corrected according to the state of the catalyst (step 12). This correction process is shown by the flowchart of FIG. 8. For the sake of convenience, FIG. 8 shows the correction of both the rich control constant Pl and the lean control constant Pr although only the correction of Pl is actually executed in step 12.

Figure 9:
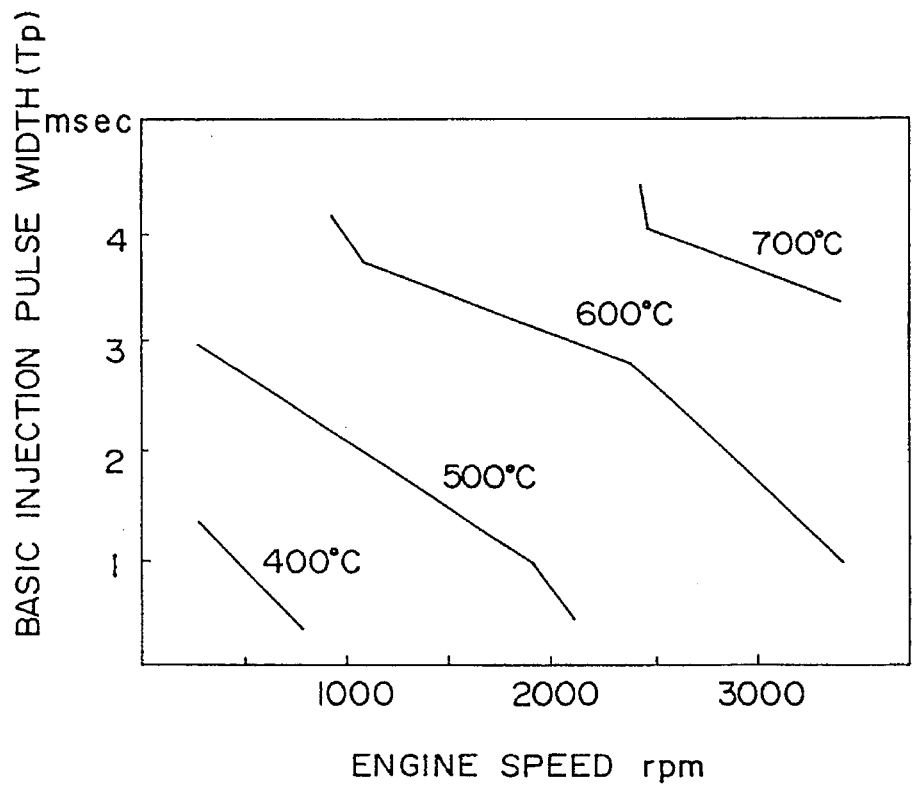
FIG. 9 is a graph showing a relation between engine exhaust gas temperature, speed and load under steady state running conditions.

First, a target steady state temperature TMPTGT of the converter inlet is looked up from a map shown in FIG. 9 based on the speed Ne and load Tp at that time (step 20). Next, a real exhaust gas temperature T detected by the inlet temperature sensor 6 is entered (step 21), and a temperature difference ΔT is computed from ΔT=TMPTG−T (step 22).

Figure 10:
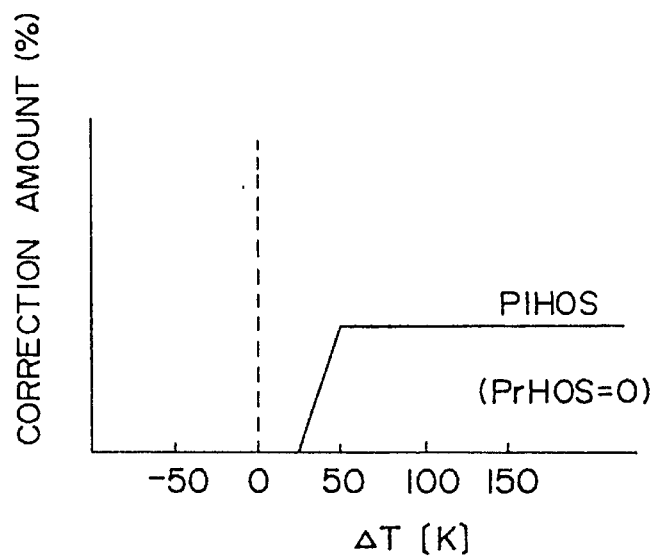
FIG. 10 is a graph of a correction amount PIHOS applied to a control constant used by the air-fuel ratio controller according to the first embodiment of this invention.

A correction amount PIHOS of the control constant is then searched from a map shown In FIG. 10 according to the calculated temperature difference ΔT (step 23).

During engine acceleration, the real temperature is lower than the target steady state temperature, and as the a-fuel ratio required by the catalyst under these conditions is richer than the theoretical air-fuel ratio, the air-fuel ratio must be corrected further to rich. If the temperature difference ΔT is 50 K (absolute temperature) or more, the proportional amount Pl of the control constant is corrected such that it increases to rich by the following equation (step 23):

$$Pl=Pl+PIHOS$$

where the correction amount PtHOS is of the order of 0.5%.

When ΔT is 25 or less, the correction is not performed in this "insensitive" region so as to confer some degree of stability on the control.

Figure 11:
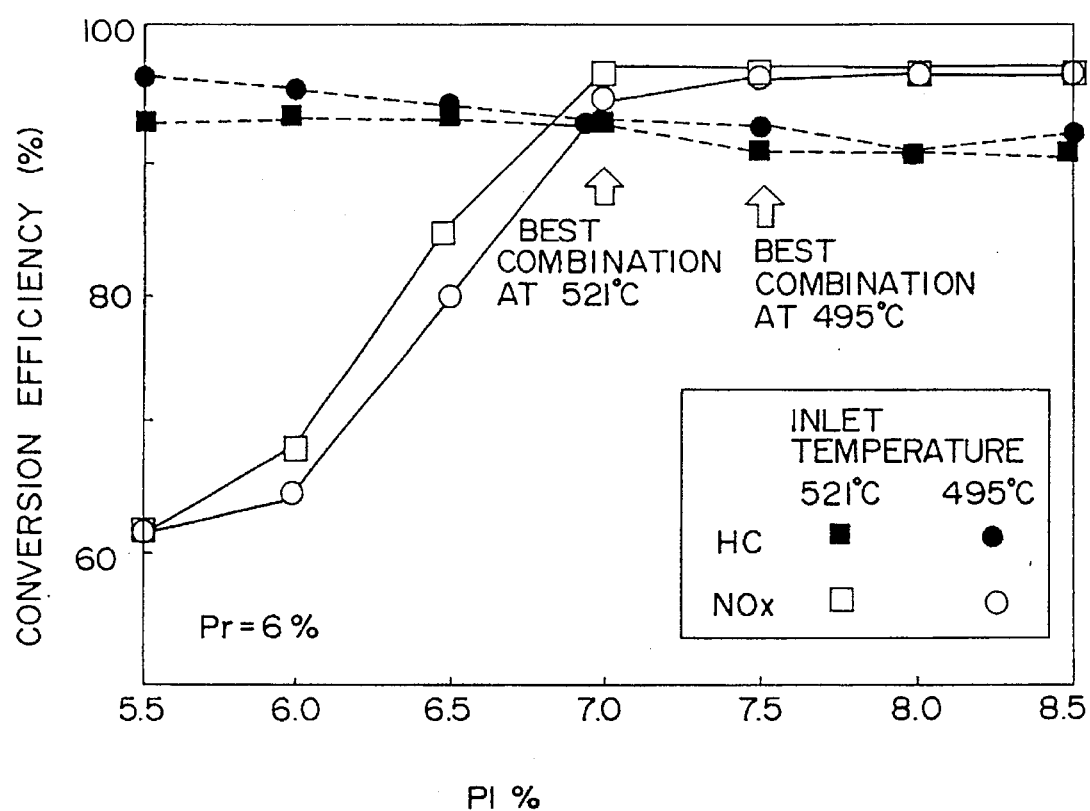
FIG. 11 is a graph showing a relation between a control constant proportional amount Pl and catalyst conversion efficiency under steady state running conditions.

FIG. 11 shows the relation between the proportional amount Pl of the rich control constant and the conversion efficiency In the steady state. As an example, consider the case when the converter inlet temperature falls from 521° C. to 495° C. The white and black squares in the figure show the conversion efficiency of the catalyst at 521° C., whereas the white and black circles show its efficiency at 495° C. At 521° C., the optimum value of Pl at which HC and NOx both decrease is 7.0%, but at 495° C. it is 7.5%. Therefore, if the converter inlet temperature falls from 521° C. to 495° C., the conversion efficiency of the catalyst will be less by a corresponding amount if 7.0% is still used as the value of Pl.

Figure 12:
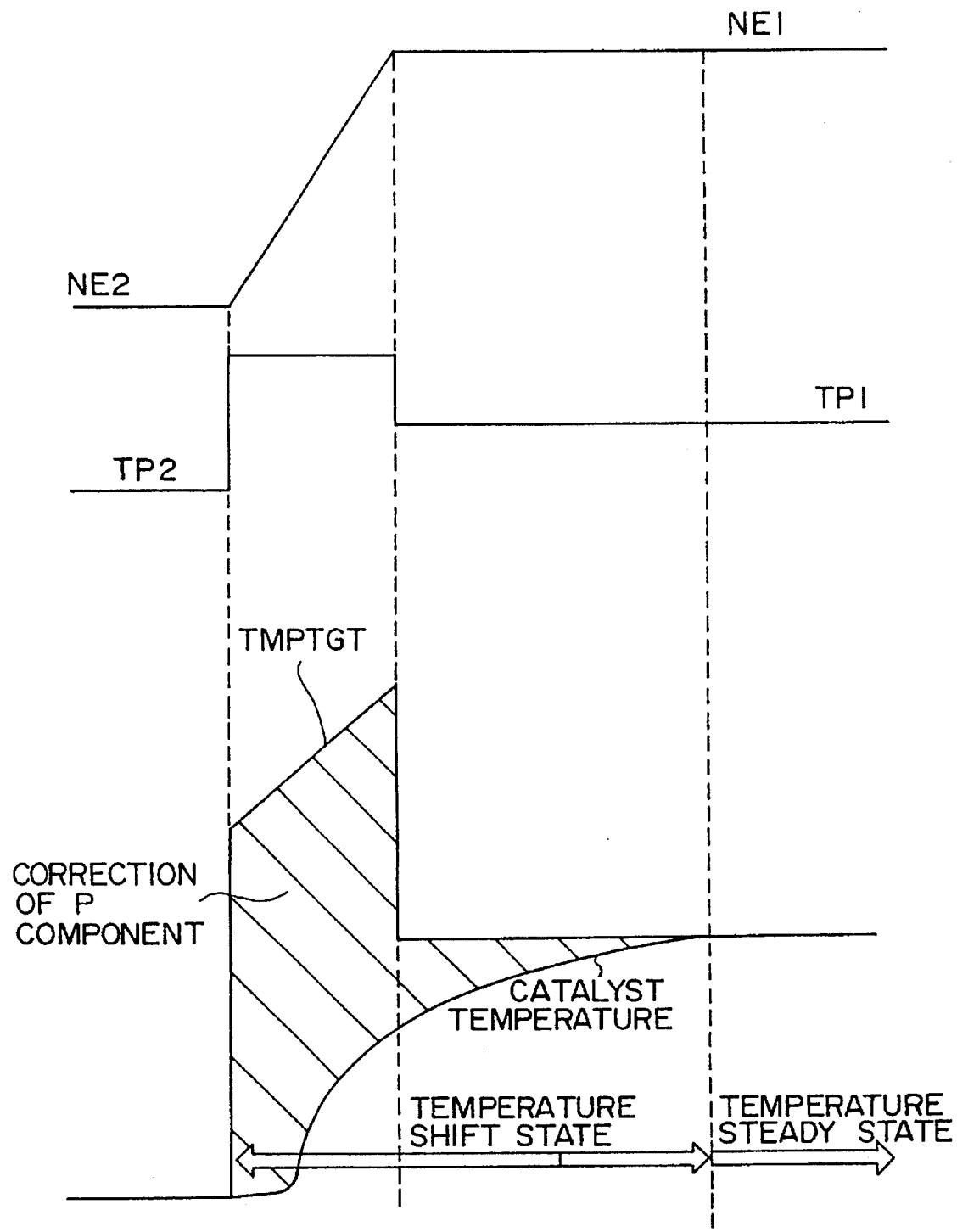
FIG. 12 is a diagram showing a relation between a change of engine running conditions and the correction of the control constant proportional amount.

The conversion efficiency therefore varies according to the catalyst temperature, and the required air-fuel ratio also slightly fluctuates. Hence, when the exhaust gas temperature is lower than the steady state temperature as when the engine is accelerating, for example, the proportional amount Pl is increased depending on the difference ΔT so as to make the control constant correspond to the real state of the catalyst, as shown in FIG. 12, and decrease of conversion efficiency is thereby prevented. When the process of correcting the control constant of FIG. 8 is complete, the routine returns to the process of FIG. 7. The correction constant α for feedback control of the air-fuel ratio is then computed from the relation α=α+Pl using the corrected value of Pl, and the air-fuel ratio is feedback controlled accordingly (step 13). On the other hand, when it is determined from the oxygen concentration in the aforesaid step 2 that the air-fuel ratio is rich, It is determined whether or not it was rich on the immediately preceding occasion (step 3). If it was rich on the immediately preceding occasion, a proportional amount Pr of the control constant at that time is searched from the engine speed and load in order to correct the air-fuel ratio to lean (step 5), and the control constant is thereby corrected (step 6). This correction is based on the temperature difference ΔT according to the flowchart of FIG. 8 mentioned hereintofore.

According to this embodiment, when controlling the air-fuel ratio to lean, the correction amount PrHOS is set equal to 0 so that no correction of the control constant is actually made. This is due to the fact that the impairment of the exhaust gas cleaning efficiency when the real air-fuel ratio shifts to rich compared to the air-fuel ratio required by the catalyst, is much less severe than the impairment when there is a shift to lean.

Next, the correction constant a is computed from the relation α=α−Pr (step 7), and the air-fuel ratio is feedback controlled based on this value of α.

If the determination results of steps 3 and 4 are different from the results for the immediately preceding occasion, rich and lean integral parts IL, IR of the control constant are respectively computed (steps 8–10, steps 14–16). This process is the same as that of ordinary feedback control wherein the air-fuel ratio is controlled to a theoretical air-fuel ratio. In this case, no correction based on the temperature difference ΔT is performed.

As the change of air-fuel ratio in unit time due to the integral part I is less than that due to the proportional part P of the control constant, small fluctuations of the air-fuel ratio required by the catalyst may be easily accommodated by correcting only the proportional part P.

Under transient running conditions such as deceleration, the temperature difference ΔT is less than 0, i.e. the real exhaust gas temperature is higher than the steady state temperature of the exhaust gas. In this case, the deterioration of the exhaust gas components is less than during acceleration, and due also to the fact that less exhaust gas is produced during deceleration, the catalyst can clean it efficiently even if the air-fuel ratio shifts slightly from the required value. Hence here too, according to this embodiment, no correction of the control constant is made.

It is however possible to correct the control constant when ΔT<0. A map of PrHOS for correcting the proportional amount to lean is then generated as in the case of the map of FIG. 10, and PlHOS is set equal to 0. According to this map, the proportional part Pr of the control constant is increased so as to correct it towards lean, however a similar result may be achieved when ΔT<0 by decreasing Pl instead of increasing Pr.

Figure 13:
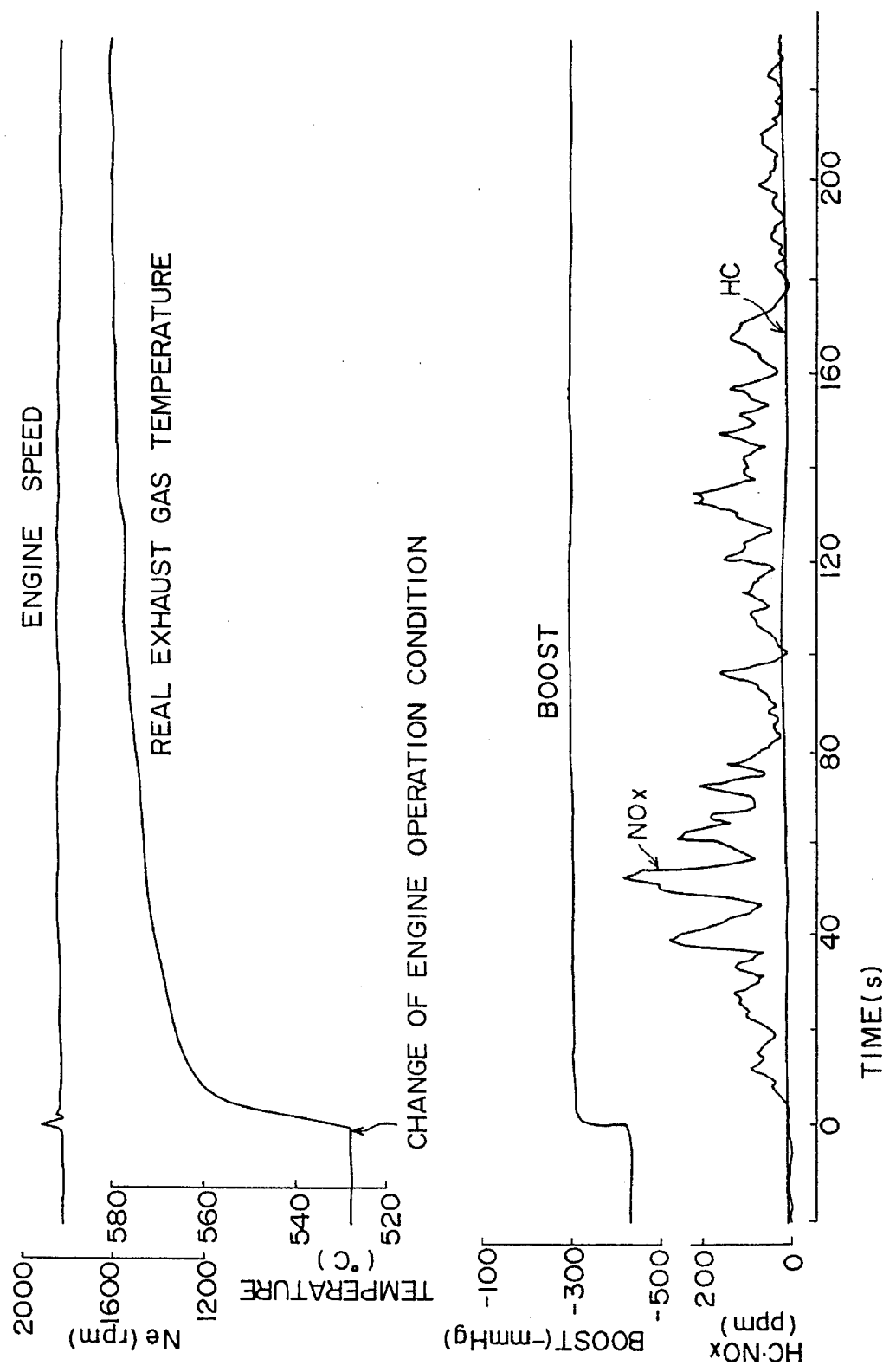
FIG. 13 is a graph showing a relation between engine load variation and exhaust amounts of NOx and HC.

FIG. 13 shows the state of NOx and HC in the exhaust when the load (Boost) is varied at constant engine speed and the aforesaid correction of the control constant is not made. As can be seen from this figure, the amount of NOx temporarily increases during the period from immediately after the change of load to when the real exhaust gas temperature reaches a steady state. This is due to the fact that the control constant is changed immediately when the load is changed so as to control the air-fuel ratio by a control constant corresponding to high temperature, when in fact the real catalyst temperature is lower. Hence, the efficiency of converting NOx decreases.

According to this invention, however, the control constant is corrected according to the difference between the target steady state temperature and the real exhaust gas temperature. Consequently, as the control constant is appropriate even while the catalytic converter is warming up, the emission of NOx can be significantly decreased.

According to this embodiment, the steady state temperature of the converter inlet is computed, and the real exhaust gas temperature at the converter inlet is measured by the inlet temperature sensor 6. However, as there is a fixed relation between the exhaust gas temperature upstream of the converter and the converter inlet temperature, the steady state temperature of the exhaust gas upstream of the converter may be computed instead, the real exhaust gas temperature being measured by the sensor to give a difference ΔT and the control constant being corrected accordingly to reflect the state of the catalyst as before.

Alternatively, the steady state temperature at the converter outlet may be computed, the real exhaust gas temperature at the converter outlet measured by means of an outlet temperature sensor 12, and the control constant corrected based on this difference. In this case, the control will take account of the degree of warm-up of the catalyst and the state of the catalyst under transient conditions.

Next, a second embodiment of this invention will be described.

This second embodiment concerns detection of the real exhaust gas temperature. It may be assumed that when the engine is running under normal conditions, the real exhaust gas temperature has a first order delay with respect to the steady state temperature. Instead of measuring the converter inlet temperature by means of the sensor 6, therefore, this temperature may be estimated from the steady state exhaust gas temperature and the exhaust gas flowrate.

The estimated temperature is computed as follows. Assume that the estimated temperature is TCATIN, the steady state exhaust gas temperature is TMPTGT, a first temperature component derived from heat transferring by exhaust gas is TCAT1, a second temperature component derived from heat transferring by a conduit or the like is TCAT2, the combining proportion is GRATE, a first component time constant is SCNST, and a second component time constant is LCNST. The estimated temperature TCATIN is then given by the following equation:

$$TCATIN=TCAT1*(1-GRATE)+TCAT2* GRATE$$

Figure 14:
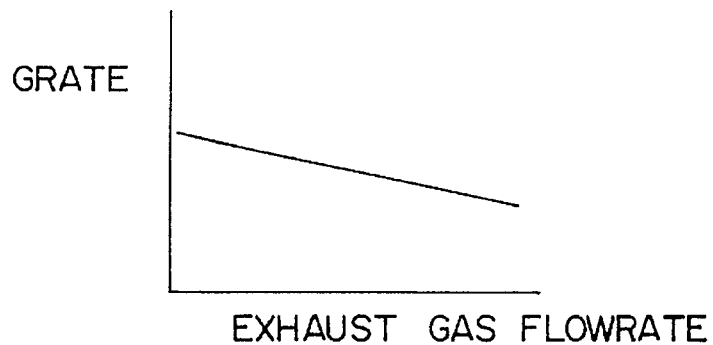
FIG. 14 is a graph showing contents of a map of a combining proportion GRATE used by the air-fuel ratio controller according to a second embodiment of this invention.
Figure 15:
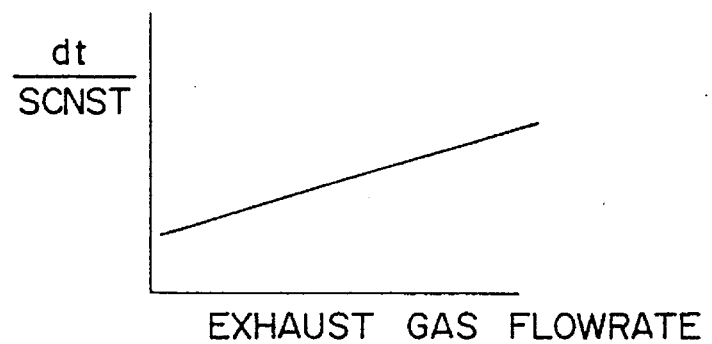
FIG. 15 is a graph showing contents of a map of a high frequency time constant used by the air-fuel ratio controller according to the second embodiment of this invention.
Figure 16:
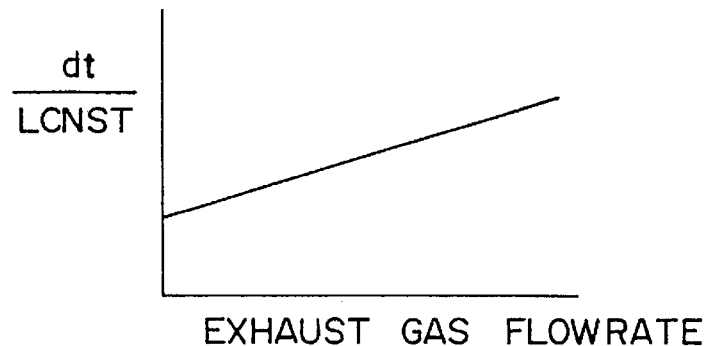
FIG. 16 is a graph showing contents of a map of a low frequency time constant used by the air-fuel ratio controller according to the second embodiment of this invention.

TCAT1 and TCAT2 may be found from the relations given below. GRATE, dt/SCNST and dt/LCNST vary linearly with the variation of exhaust gas flowrate as shown in FIG. 14 to FIG. 16, therefore they can be directly computed from the exhaust gas flowrate or they may be read from a memory. The exhaust gas flowrate can be computed from the engine speed and load. In the following equations, $TCAT1_n$ ($TCAT2_n$) represents current temperature, while $TCAT1_{n-1}$ ($TCAT2_{n-1}$) represents temperature on the immediately preceding occasion in the control cycle:

$$TCAT1_n=TCAT1_{n-1}+(TMPTGT-TCAT1_{n-1})*dt/SGNST$$

$$TCAT2_n=TCAT2_{n-1}+(TMPTGT-TCAT2_{n-1})*dt/LCNST$$

Figure 17:
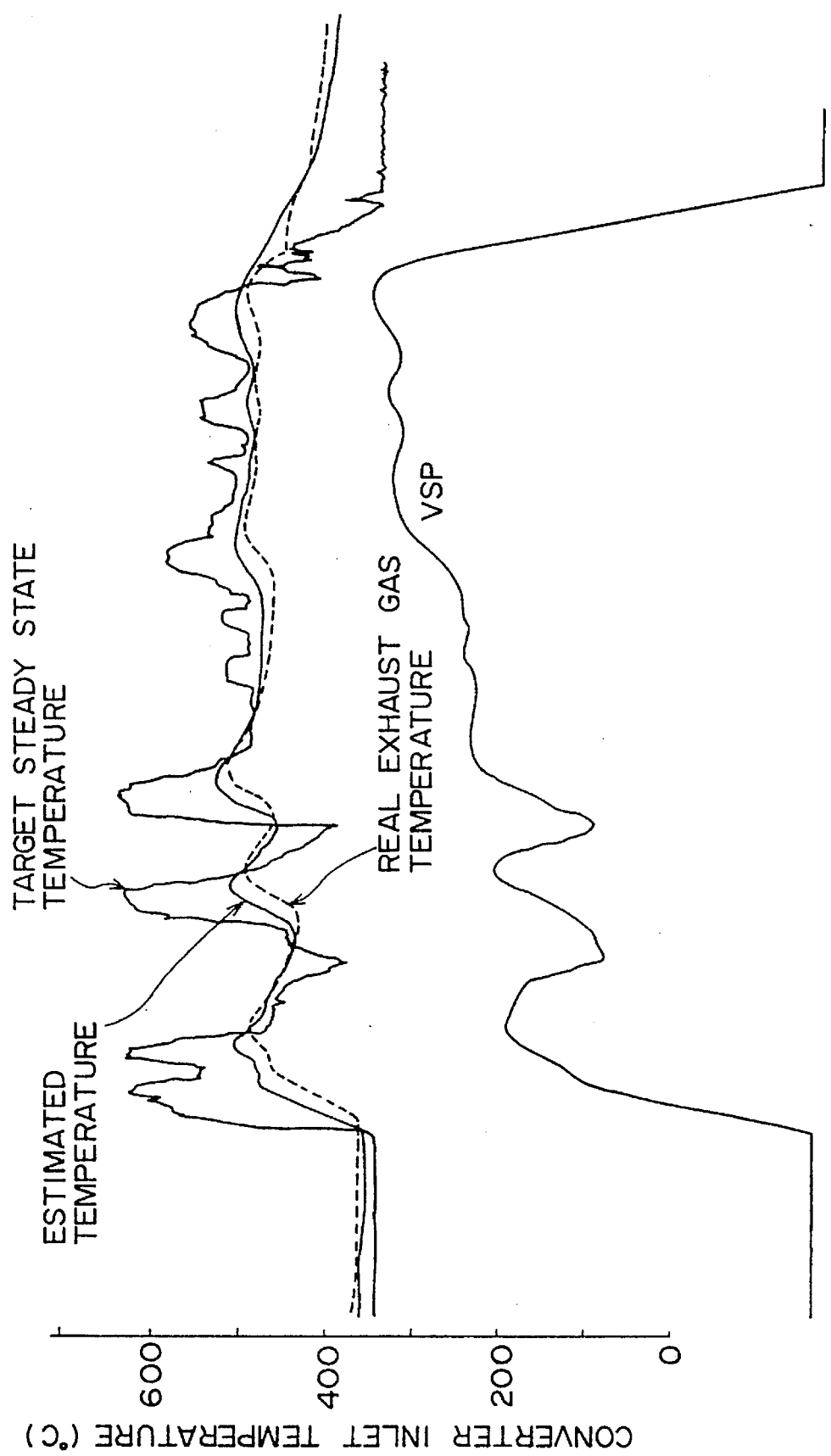
FIG. 17 is a graph showing a relation between an exhaust system temperature and estimated exhaust gas temperature.

FIG. 17 shows the variation of estimated exhaust gas temperature with respect to the steady state temperature. It is seen that, although the estimated exhaust gas temperature has some phase shift with respect to the real exhaust gas temperature, the estimated temperature is nevertheless effectively close to the real temperature. Also, the real exhaust gas temperature is higher than the steady state temperature when for example the load becomes smaller after the engine has been consistently running on high load. In such a case, the control constant is corrected in the reverse direction.

Hence, by estimating the exhaust gas temperature instead of measuring the real temperature, and correcting the control constant according to the difference between the estimated temperature and steady state temperature, the temperature sensors 6 and 12 are unnecessary. This obviates the need to consider the time-dependent variation of sensor characteristics or individual idiosyncrasies of the sensors, and there is moreover no need to be concerned regarding possible faults in the sensors 6 and 12.

Next, a third embodiment of this invention will be described.

According to the third embodiment, the aforesaid correction amount PlHOS (PrHOS) of the control constant is set based on the absolute value of the catalyst temperature in addition to the temperature difference ΔT between the steady state exhaust gas temperature and the real exhaust gas temperature, thus permitting a control which corresponds to the state of the catalyst to an even greater degree.

Figure 18:
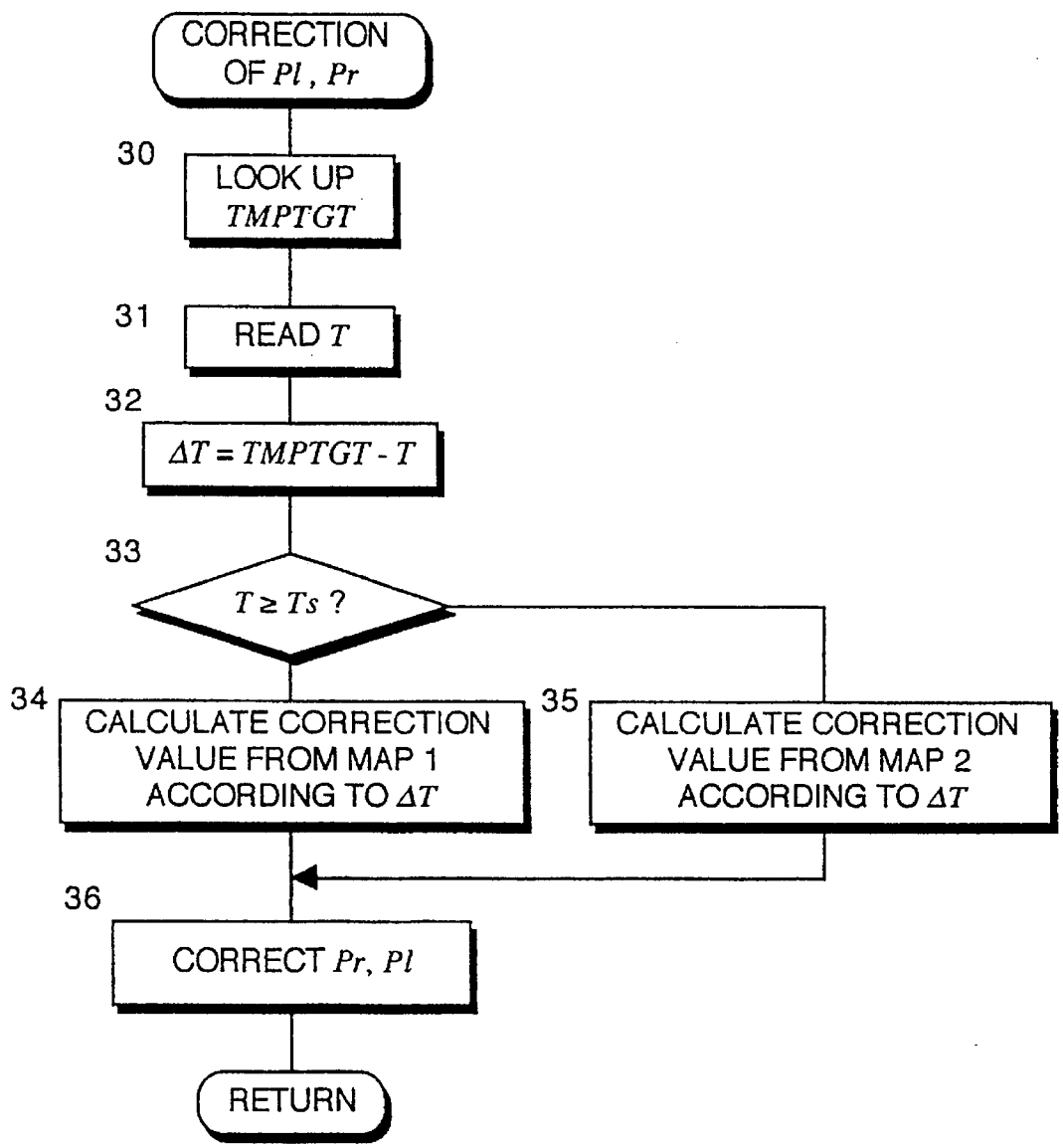
FIG. 18 is a flowchart showing a correction process of a control constant performed by an air-fuel ratio controller according to a third embodiment of this invention.
Figures 19A, 19B:
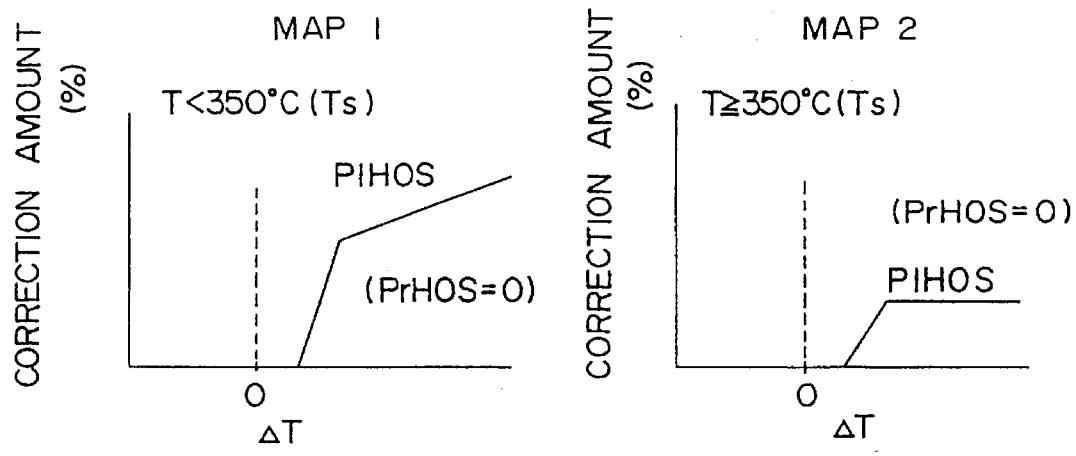
FIG. 19A and 19B are graphs showing contents of maps of a control constant PlHOS used by the air-fuel ratio controller according to the third embodiment of this invention.

As shown in FIG. 19A and 19B, a boundary of for example 350° C. may be set so that maps of the correction amount are respectively generated for the two cases where the temperature is lower or higher than this boundary. One of these maps is then selected depending on the absolute value of the temperature at any particular time, and the correction amount is computed according to the temperature difference on the selected map. The flowchart of FIG. 18 shows the details of the correction performed in steps 6 and 12 of FIG. 7.

More specifically, the target steady state temperature TMTGT and the real exhaust gas temperature are looked up (step 30 and 31), and the temperature difference ΔT is computed from ΔT=TMTGT–T (step 32). Next, the real temperature T is compared with a preset predetermined value Ts (step 33) which may for example be 350° C. When the temperature is lower than this boundary temperature, the correction amount PlHOS is computed from the map of FIG. 19A (step 34); when it is higher than this boundary temperature, PlHOS is computed from the map of FIG. 19B (step 35).

The proportional amounts Pl and Pr of the control constant are then corrected based on these correction amounts in a step 36.

Even for the same temperature difference, the required air-fuel ratio is different when the catalyst is active from when it is not active. Hence, by selecting the map for setting a different correction amount according to the absolute value of the temperature as described hereintofore, the air-fuel ratio can be feedback controlled by a control constant that corresponds better to the real state of the catalyst.

It will of course be understood that this technique may be applied not only in the estimation procedure, but also when finding the real exhaust gas temperature.

Figure 20:
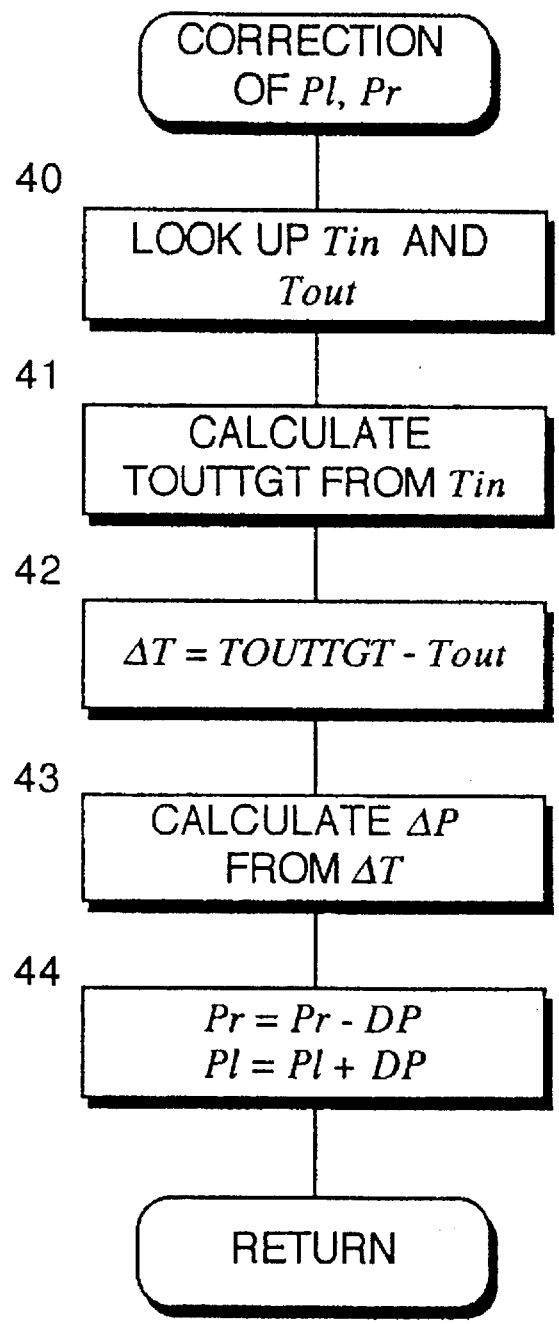
FIG. 20 is a flowchart showing a correction process of a control constant performed by an air-fuel ratio controller according to a fourth embodiment of this invention.

FIG. 20 describes a fourth embodiment of this invention.

Before catalytic converter warm-up is complete, the cleaning activity of the catalyst is inadequate and not much reaction heat is evolved, hence the converter outlet temperature is lower than under steady state conditions, i.e. lower than the outlet temperature after converter warm-up is complete. The warm-up state of the converter may therefore be determined by calculating the difference of the outlet temperature from the steady state temperature at the converter outlet.

The degree of warm-up of the converter has a major impact on the air-fuel ratio which allows the catalyst to operate most efficiently. Consequently, even if the response delay of the converter with respect to speed and load variations is ignored, and the correction of the control constant is performed taking account only of the effect of converter warm-up, a significant improvement of toxic emissions is still obtained.

For this purpose, the converter inlet temperature which is actually detected is taken as a steady state temperature, the steady state temperature at the converter outlet is approximately computed from this inlet temperature, and the difference from the real outlet temperature is calculated.

The correction of the control constant as in steps 6 and 12 of the flowchart of FIG. 7 is performed according to the method of this embodiment by the process shown in FIG. 20.

An inlet temperature Tin and outlet temperature Tout are read from the output of the exhaust gas temperature sensors 6 and 12 (step 40), and a steady state outlet temperature TOUTTGT is computed from the detected inlet temperature Tin (step 41).

Figure 21:
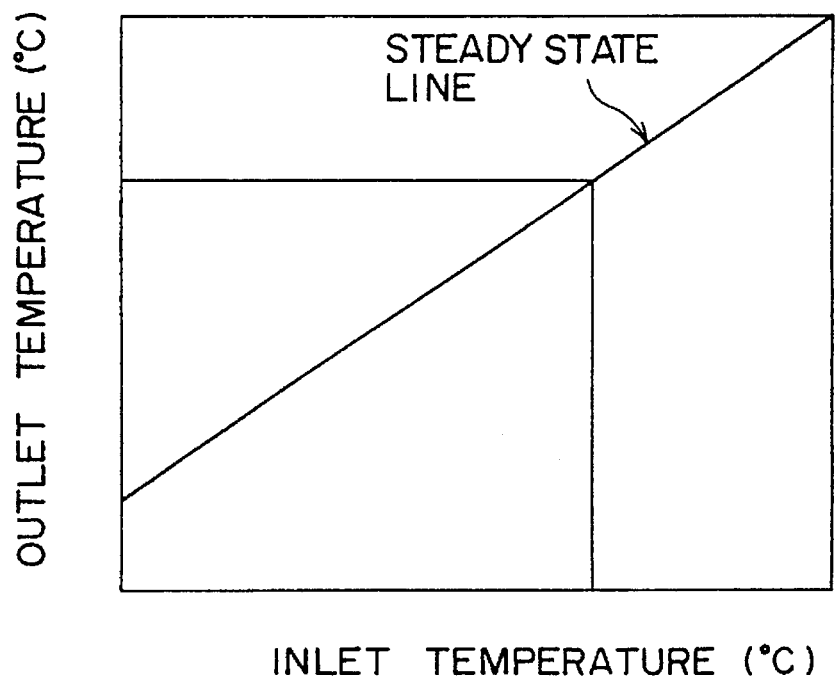
FIG. 21 is a graph showing contents of a map of a steady state temperature used by the air-fuel ratio controller according to the fourth embodiment of this invention.

This steady state temperature is looked up from a map shown in FIG. 21. When the converter is in a steady state, there is a fixed relation between the converter inlet temperature and outlet temperature as shown in the figure, so the steady state outlet temperature may be found if the inlet temperature is known.

Figure 22:
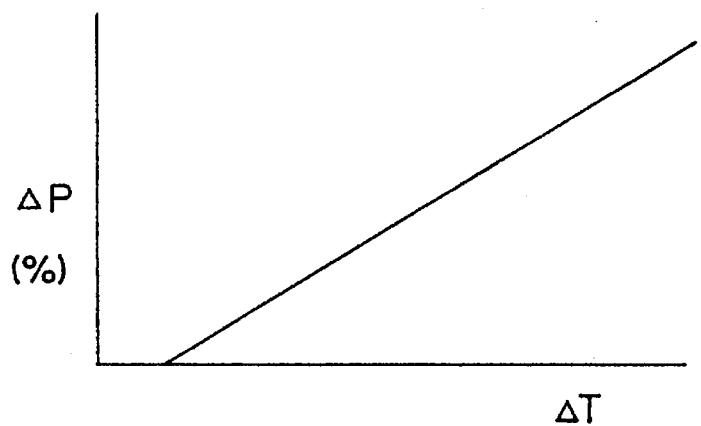
FIG. 22 is a graph showing contents of a map of a correction amount ΔP used by an air-fuel ratio controller according to a fifth embodiment of this invention.

Next, a temperature difference $\Delta T$ between the steady state outlet temperature TOUTTGT and the real outlet temperature Tout is computed (step 42), and a correction amount $\Delta P$ of the control constant is computed from a map shown in FIG. 22 according to this difference $\Delta T$ (step 43). This correction amount DP increases the larger the temperature difference $\Delta T$. The proportional amounts Pr, Pl of the control constant are then corrected using the relations Pr=Pr−$\Delta P$ or Pl=Pl+$\Delta P$ (step 44).

The temperature difference $\Delta T$ between the steady state temperature at the converter outlet and the real outlet temperature expresses the ,degree of warm-up of the converter. If the real temperature is lower than the steady state temperature at the converter outlet, a correction coefficient may be computed to permit optimum control corresponding to the state of the converter even before converter warm-up is complete. More specifically, a large temperature difference $\Delta T$ signifies that converter warm-up is incomplete.

In such a situation, the air-fuel ratio required by the converter is richer than under steady state conditions, hence if the control constant is corrected so as to shift the average air-fuel ratio to rich, NOx can be decreased without increasing HC.

In all of the aforementioned embodiments, the control constant is continually corrected, however when the temperature variation of the converter is small, a more stable control would be achieved if such a correction were not applied. Despite this, as the correction of the control constant is based on the difference between the steady state temperature and the real temperature, and the engine speed and load which provide the computational basis for the steady state temperature vary slowly even when the engine is running under conditions close to the steady state, the control constant inevitably becomes corrected.

The correction of the control constant by $\Delta T$ under steady state conditions is therefore interrupted by providing an insensitive (zero correction) zone when the temperature difference $\Delta T$ is small. However, this means that under transient conditions, e.g., during acceleration, when there is a large variation of converter temperature, no correction of the control constant is possible until this insensitive zone has been passed, and the control response is consequently delayed during this period.

Figure 23:
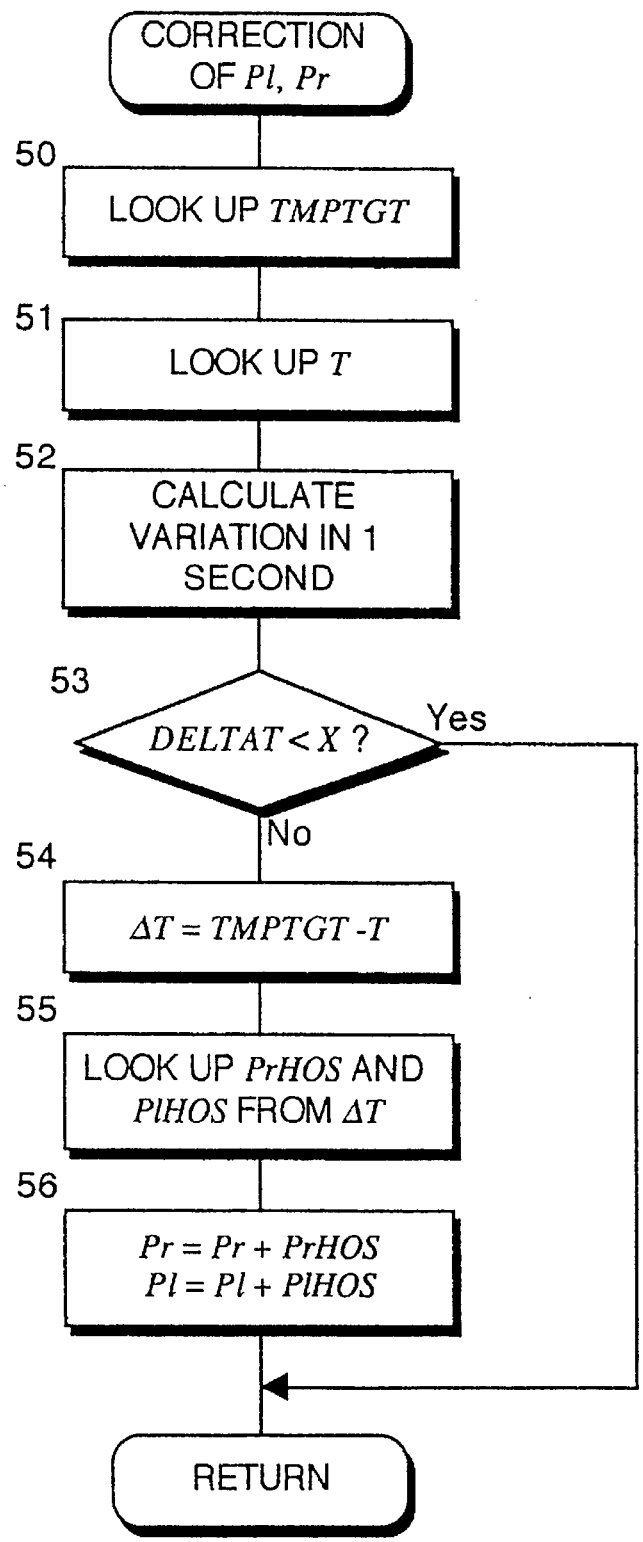
FIG. 23 is a flowchart showing a correction process of a control constant performed by the air-fuel ratio controller according to the fifth embodiment of this invention.

Hence, according to a fifth embodiment of this invention shown in FIG. 23, a zone insensitive to the temperature difference $\Delta T$ is not provided, and instead the correction is not applied when the rate of temperature variation is small. In this way, both control stability and control response are improved.

The basic part of this embodiment has the same structure as that of the first embodiment shown in FIG. 8. The embodiment will now be described using the flowchart of FIG. 23 with particular reference to steps 52, 53 which are different from FIG. 8.

After the real exhaust gas temperature T has been found (step 51), the rate of variation DELTAT of the exhaust gas temperature in unit time (1 second) is computed (step 52). This temperature variation (variation rate) is then compared with a predetermined value X (step 53). If DELTAT is greater than the predetermined value X, the control constant is corrected (steps 54–56); conversely, if DELTAT is smaller than the predetermined value X, it is determined that the converter temperature is in the steady state, steps 54–56 are skipped, and the control constant is not corrected.

In this case, in FIG. 10, the zone insensitive to temperature difference $\Delta T$ (below 25K in the figure) is eliminated, and the correction coefficient may for example be made to increase from the region of zero temperature difference.

Hence, when the converter temperature variation is small and the catalyst is effectively in the steady state, no correction of the control constant is applied, and instability due to overcorrection is avoided. On the other hand, when there is a sudden temperature change as under transient conditions, the control constant is corrected without delay while the temperature difference is still small, so air-fuel ratio control follows changes in the state of the converter with excellent response.

Figure 24:
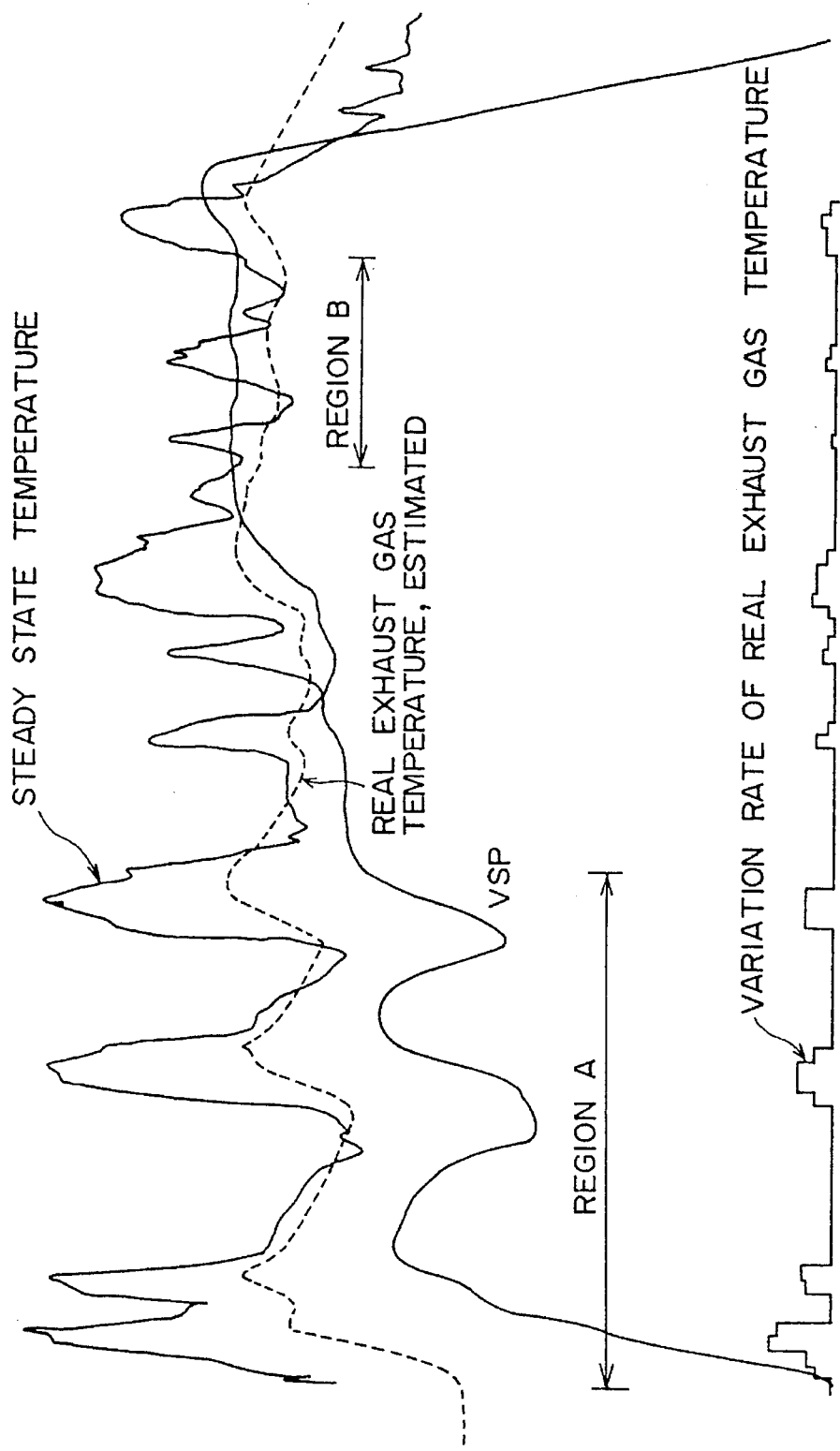
FIG. 24 is a diagram showing a relation between exhaust steady state temperature, estimated temperature and real temperature under various conditions including transient conditions.

FIG. 24 shows how the exhaust gas temperature varies under transient and other conditions. In a region A where transient conditions (acceleration and deceleration) continue, the rate of exhaust gas temperature variation is high, whereas in a region B which is close to the steady state, the rate of exhaust gas temperature variation is low. By starting correction of the control constant immediately after a shift to region A, the response to a change of air-fuel ratio required by the converter is enhanced. In region B, the steady state temperature does vary even for a small change of engine speed and load, however the engine and the converter temperature are both effectively in the steady state. Under such circumstances, if a correction of the control constant were applied based on the variation of steady state temperature, the air-fuel ratio would be controlled to a value removed from the real state of the converter, and control stability would be poor. However, by interrupting the correction when the rate of variation of exhaust gas temperature is less than a set value, this type of problem is avoided.

Figure 25:
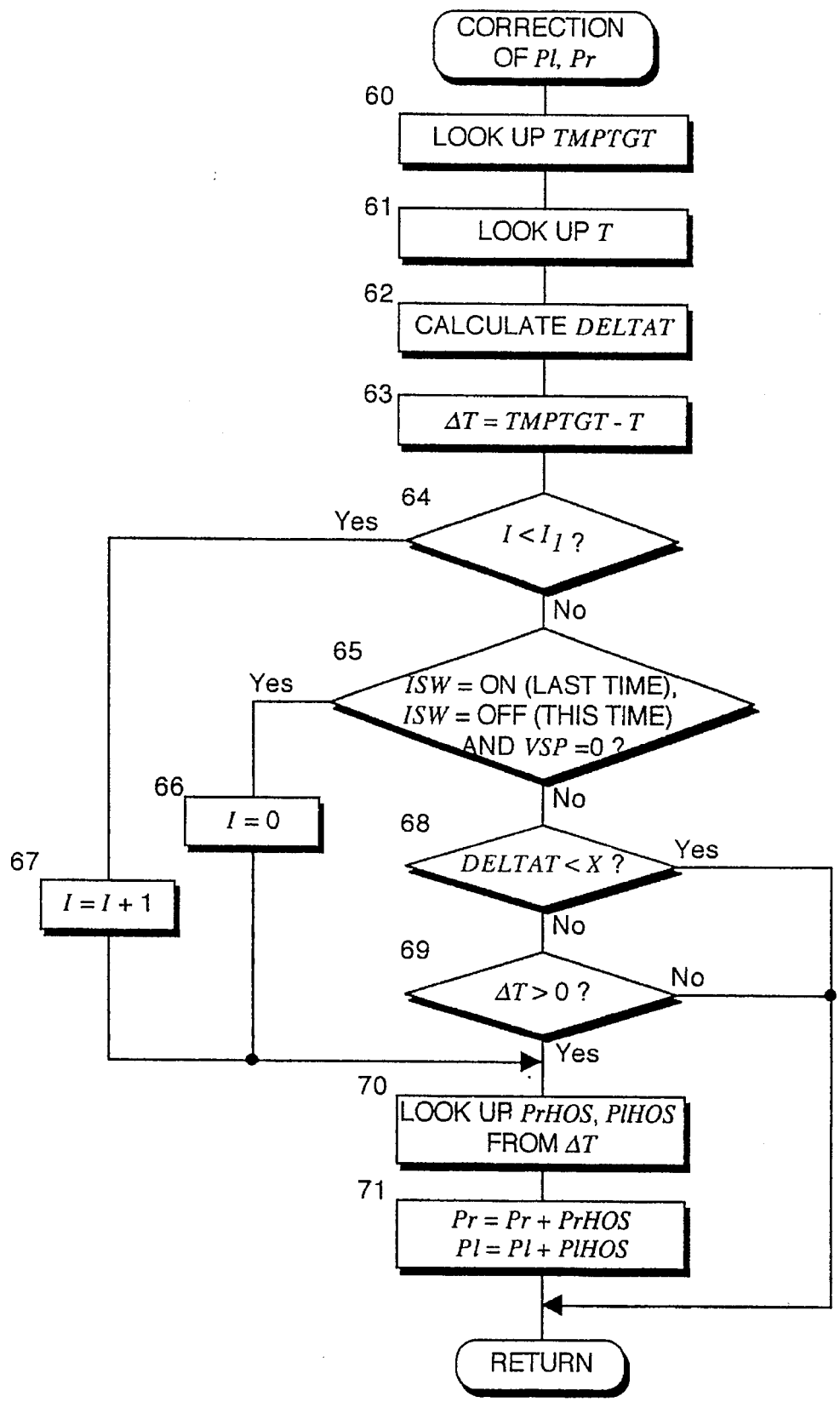
FIG. 25 is a flowchart showing a correction process of a control constant performed by an air-fuel ratio controller according to a sixth embodiment of this invention.

FIG. 25 shows a sixth embodiment of this invention intended to prevent response delay in the correction in the initial stage of acceleration, as when the vehicle starts for example. In this case, correction of the control constant begins when the idle switch changes over from ON to OFF regardless of the converter temperature variation. The idle switch is ON when the throttle 9 is fully closed.

This embodiment will be described using the flowchart of FIG. 25 with particular reference to the part which is different from the flowchart of FIG. 23, i.e. steps 64–67. After finding an exhaust gas temperature variation DELTAT or temperature difference $\Delta T$, the elapsed time after vehicle start-up (step 64) and vehicle start-up (step 65) are determined.

Vehicle start-up is determined by verifying that the idle switch has changed over from ON to OFF, and that the vehicle speed VSP at that time is zero. According to this embodiment a vehicle speed sensor, not shown, is provided in addition to the structure shown in FIG. 1, and a vehicle speed signal VSP detected by this sensor is input to the control unit 5. When it is determined that the vehicle has started up, the time I elapsed from the start-up is set equal to 0 by initializing a timer (step 66), and the control constant is corrected regardless of the catalyst temperature variation (steps 70, 71).

The time I which has elapsed from the start-up is then determined by comparing it with a set value $I_1$. Provided the time I is less than the set value $I_1$, the timer is incremented according to the relation I=I+1 (step 67), and the control constant is corrected (steps 70, 71). Thereafter, the correction of the control constant continues to be applied until the time I elapsed from the start-up reaches the set value $I_1$.

When the time I elapsed from start-up reaches the set value $I_1$, the routine proceeds to the step 65, but as the result of determining whether or not the vehicle is starting up is then NO, the routine always proceeds to the step 68 where the control constant is corrected based on the rate of converter temperature variation DELTAT and the temperature difference ΔT (steps 68–71). The time I which has exceeded the set time $I_1$ is stored without being cleared until start-up is again determined, hence the control routine proceeds from the step 64 to the step 65 on each occasion until start-up is again determined. Also, when the controller is initially used, the elapsed time I is initialized to a value exceeding $I_1$.

Figure 26:
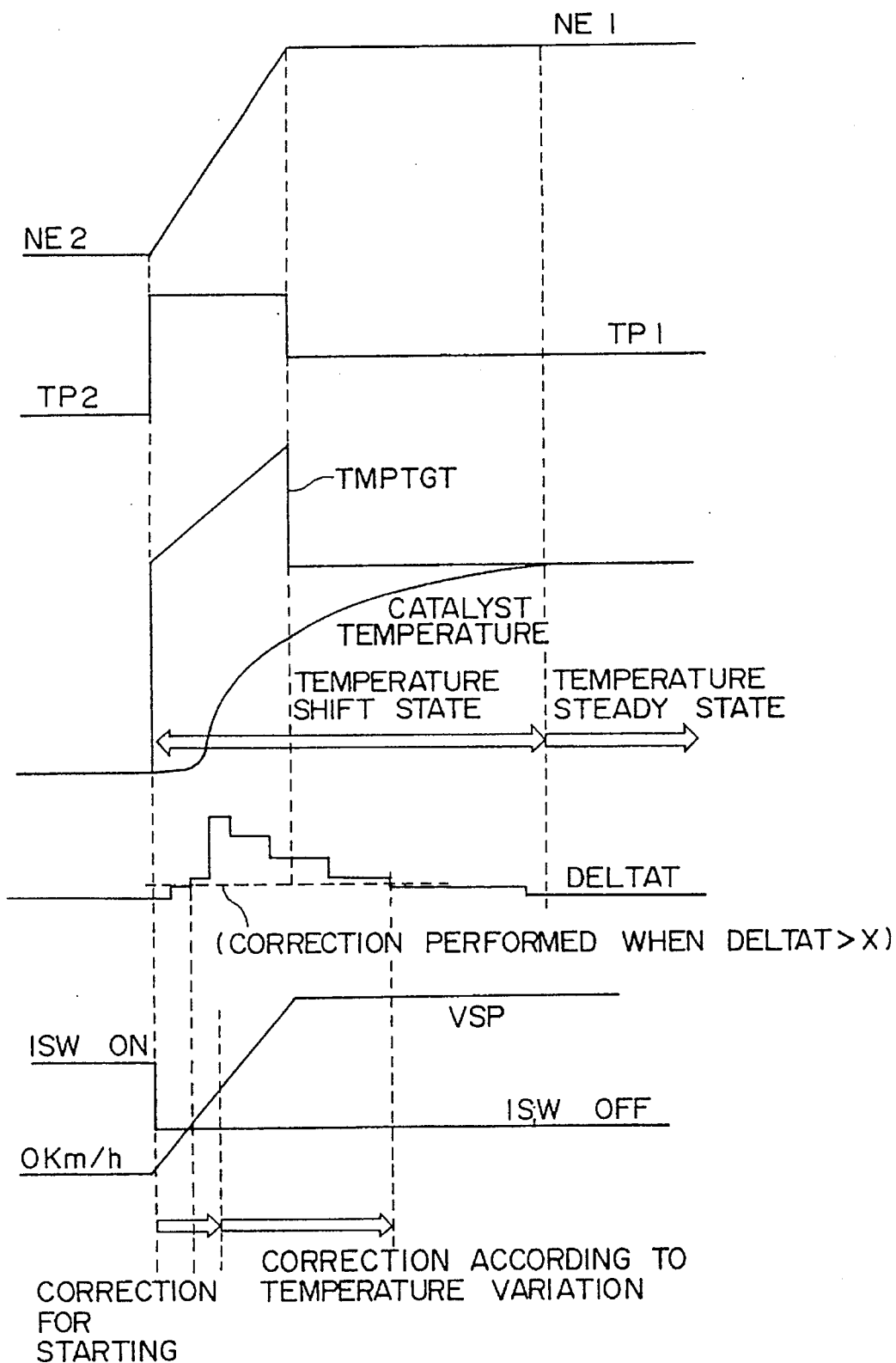
FIG. 26 is a diagram showing a relation between variation of engine running state and correction of a control constant proportional amount performed by the air-fuel ratio controller according to the sixth embodiment of this invention.

In this manner, correction of the control constant begins immediately regardless of the rate of converter temperature variation when the vehicle is starting up. In the initial stage of acceleration after start-up, the rise of converter temperature variation is momentarily delayed as shown in FIG. 26, hence If the correction were not begun until after the delay, the air-fuel ratio would be corrected to a leaner value than that actually required by the converter. However, as described hereintofore, the correction is begun for a predetermined period from the initial state of acceleration upon a signal from the idle switch regardless of the temperature change, and high response control can therefore be performed.

Figure 27:
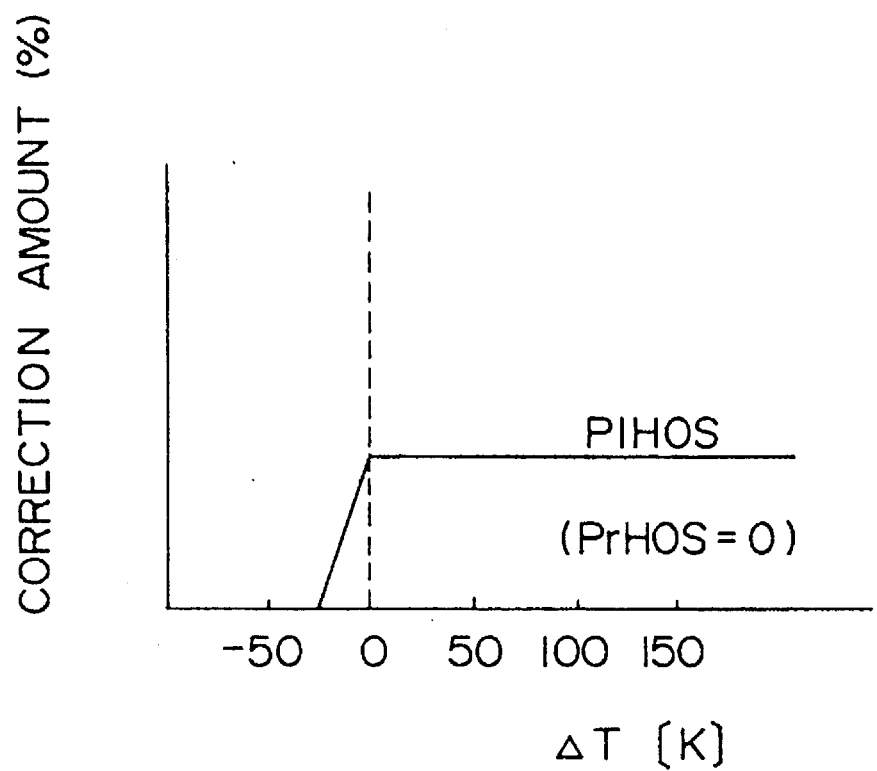
FIG. 27 is a graph showing contents of a map of a control constant PlHOS used by the air-fuel ratio controller according to the sixth embodiment of this invention.

During acceleration after start-up, the air-fuel ratio tends to be leaner than the air-fuel ratio required by the converter, so if the correction amount of the control constant is set to have characteristics such that a rich correction is applied even when the temperature difference ΔT is a negative value (i.e. the real temperature is higher than the steady state temperature), as shown in FIG. 27, the real air-fuel ratio can be made to approach the required air-fuel ratio with an even better response.

The embodiments of this Invention in which an exclusive property or privilege is claimed are defined as follows:

1. An air-fuel ratio controller for use with an engine which has a cylinder for burning a fuel mixed with air, an intake passage for providing said air to said cylinder, a throttle for regulating an amount of said air, an exhaust passage for expelling exhaust gas from said cylinder, and a catalytic converter having an inlet and an outlet connected to said exhaust passage in order to clean said exhaust gas, said controller comprising:

sensor means for detecting an oxygen concentration in said exhaust gas, means for feedback controlling an air-fuel ratio in said cylinder by means of a predetermined control constant according to said oxygen concentration such that said air-fuel ratio is close to a theoretical air-fuel ratio, means for detecting an engine speed, means for detecting an engine load, means for setting said control constant based on said speed and load, means for eliminating an exhaust gas temperature based on said speed and load, means for detecting a real exhaust gas temperature, and means for correcting said control constant such that said air-fuel ratio tends to rich when said real exhaust gas temperature is less than said estimated exhaust gas temperature.

2. An air-fuel ratio controller as defined in claim 1, wherein said correcting means comprises means for calculating a difference between said real exhaust gas temperature and said estimated exhaust gas temperature, and means for computing a correction amount of said control constant based on said difference.

3. An air-fuel ratio controller as defined in claim 1, wherein said estimating means comprises means for estimating a temperature of said inlet, and said real exhaust gas temperature detecting means comprises a sensor for detecting said inlet temperature.

4. An a-fuel ratio controller as defined in claim 1, wherein said estimating means comprises means for estimating a temperature of said outlet, and said real exhaust gas temperature detecting means comprises a sensor for detecting said outlet temperature.

5. An air-fuel ratio controller as defined in claim 1, wherein said real exhaust gas temperature detecting means comprises means for computing an exhaust gas flowrate in said exhaust passage based on said speed and load, and means for estimating said inlet temperature based on said computed exhaust gas temperature and said exhaust gas flowrate.

6. An air-fuel ratio controller as defined in claim 1, further comprising means for computing a variation rate of said real exhaust gas temperature, and means for prohibiting correction of said control constant by said correcting means when said variation rate is less than a predetermined value.

7. An air-fuel ratio controller as defined in claim 1, further comprising means for detecting a fully closed state of said throttle, means for computing a variation rate of said real exhaust gas temperature, means for determining whether said variation rate is less than a predetermined value, means for determining whether a time elapsed from when it is detected that said throttle is fully closed has reached a predetermined time, and means for prohibiting correction of said control construct by said correcting means when the determination results of said two determining means are both affirmative.

8. An air-fuel ratio controller as defined in claim 2, wherein said computing means comprises means for computing said correction mount based on said difference and said real exhaust gas temperature.

9. An air-fuel ratio controller as defined in claim 2, wherein said estimating means comprises a sensor for detecting said inlet temperature and means for estimating said outlet temperature based on said inlet temperature, said real exhaust gas temperature detecting means comprises a sensor for detecting said outlet temperature, and said computing means computes said correction amount based on the difference between said estimated outlet temperature and said detected outlet temperature.

10. An air-fuel ratio controller for a vehicle which includes an engine having an exhaust passage and an intake passage, comprising:

a three-way catalytic converter provided in said exhaust passage and configured to reduce an NOx content and to oxidize an HC and CO content of exhaust gas passing through said exhaust passage;

a throttle provided in said intake passage and configured to control an intake air amount through said intake passage based on an amount of depression of an accelerator pedal of said vehicle;

a fuel injection valve configured to inject an amount of fuel into said intake passage, said amount being in accordance with a control signal received by said fuel injection valve;

an air flow meter provided in said intake passage and configured to detect an intake air amount in said intake passage and to output a first signal indicative of said intake air amount;

a crank angle sensor configured to detect a speed of said engine and to output a second signal indicative of said speed;

an oxygen sensor provided to measure an oxygen concentration in said exhaust passage and to output a third signal indicative of said oxygen concentration;

an outlet temperature sensor configured to detect an outlet temperature of said exhaust gas as it exits said exhaust passage and to output a fourth signal indicative of said outlet temperature;

a throttle opening sensor coupled to said throttle and configured to detect a degree of opening of said throttle and to output a fifth signal indicative of said degree of opening;

an idle switch coupled to said throttle and configured to detect when said throttle is fully closed and to output a sixth signal indicative of whether or not said throttle is fully closed; and a control unit configured to receive said first through sixth signals and to control a proportion of the injected amount of fuel and the intake air amount as an air/fuel ratio by outputting said control signal to said fuel injection valve based said first through sixth signals, wherein said control unit causes said fuel injection valve to decrease the injected amount of fuel when the air/fuel ratio is below a predetermined value, and to increase the injected amount of fuel when the air/fuel ratio is above the predetermined value, wherein the control unit computes a steady-state temperature at an output end of said three-way catalytic converter and receives the output temperature of said exhaust gas by said fourth signal and compares said steady-state temperature to said output temperature, and wherein said control unit outputs said control signal so as to increase the injected amount of fuel when said output temperature is less than said steady-state temperature.

11. An air-fuel ratio controller as defined in claim 10, further comprising means for determining an absolute value of a temperature of said three-way catalytic converter, and wherein said control unit receives said absolute value in order to control the proportion of the injected amount of fuel based on both said absolute value and said comparing of said steady-state temperature and said output temperature.

* * * * *